April 28, 1953     H. P. SCHANE ET AL     2,636,752
CONDUIT WITH BRANCH APPLIED AGAINST SPOT FACE OF HEADERS
Filed Nov. 24, 1947

Inventors
Harry P. Schane
Benjamin E. Fiddler
by Didier Journeaux
Attorney

Patented Apr. 28, 1953

2,636,752

UNITED STATES PATENT OFFICE 2,636,752

CONDUIT WITH BRANCH APPLIED AGAINST SPOT FACE OF HEADERS

Harry P. Schane, West View, and Benjamin E. Fiddler, Pittsburgh, Pa., assignors to Allis-Chalmers Manufacturing Company, Milwaukee, Wis., a corporation of Delaware Application November 24, 1947, Serial No. 787,694

1 Claim. (Cl. 285—106)

This invention relates in general to tubular conduits and particularly to branched conduits and to a method of fabricating and assembling tubular member joint connections.

In prior art it has been considered necessary to shape each of the several sections of pipe to be joined when fabricating conduit. Several cutting operations have been required on each pipe. One method has been to form a V-shaped opening in the wall section of one pipe. Then the end of the adjoining pipe must be cut to form an intersecting V to fit into the opening of the first pipe. Other methods such as cutting a hole in the first pipe and inserting the end of the second pipe therein cannot be used when the two pipes are of the same diameter.

It is therefore an object of this invention to provide a joint construction for tubular conduits involving a minimum of simple machining operations.

Another object of the invention is to reduce to a minimum the amount of material to be machined off in the construction of joined conduits.

The aforementioned objects are preferably accomplished in the following manner. Spot facing a wall section of a pipe and abutting the end of a second pipe against the spot face. The two pipes are then welded along the line of intersection of the surfaces of first and second pipes.

The invention is disclosed in the embodiments thereof shown in the accompanying drawing. A thorough understanding of the nature and objects of the invention may be had from the following detailed description when read in connection with the accompanying drawings, in which.

The defects inherent in prior art, some of which have been enumerated, are avoided in construction of conduit in accordance with the invention which is now described.

Figure 1:
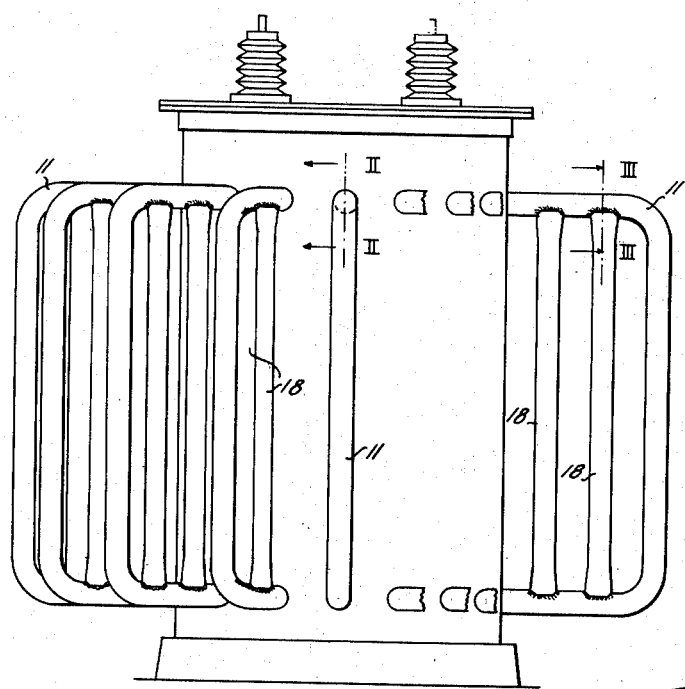
Fig. 1 is a side elevation of a transformer casing provided with a preferred type of heat dissipating conduit embodying this invention.

Fig. 1 illustrates a type of conduit comprising a cylindrical member bent to form two header sections and an interconnecting tube, the header sections being further interconnected by one or more branch pipes. This may be used for different purposes, as for heat exchange radiators for transformers as shown in Fig. 1.

Figures 3, 4:
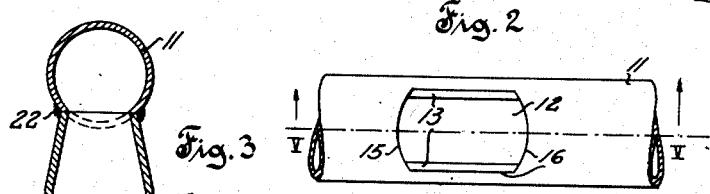
Fig. 3 is a sectional view of a conduit taken on line III—III of Fig. 1.
Fig. 4 is a bottom plan view of a portion of the header pipe cut in accordance with the teachings of this invention for building the embodiment illustrated in Fig. 2.
Figures 5, 8:
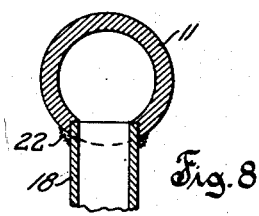
Fig. 5 is a cross-sectional view on line V—V in Fig. 4.
Fig. 8 is a sectional view similar to Fig. 3 showing a joint between pipes having appreciably different diameters.

Referring to Figs. 4 and 5, the wall of the cylindrical member 11 serving as a header is cut to form a lateral aperture 12, and horizontal plane sections 13 are formed adjacent the aperture in the wall of the header. Thus a recess 14 is formed in the wall of the header. This recess may be formed by one simple operation, such as spot facing or milling. The cutting operation may be such as to form a recess contained between cylindrical sectional surfaces 15 in the wall of the header, as shown, or as to make a recess contained between plane sectional surfaces in the wall of the header. The horizontal contour 16 of the base of the recess will vary depending upon the desired width of the aperture and upon the diameter of the end section of the branch pipe to be inserted in the recess.

Figure 7:
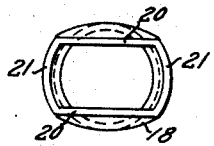
Fig. 7 is an end view of the branch pipe partially shown in Fig. 6.
Figure 6:
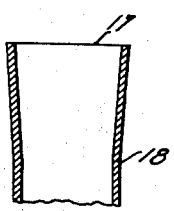
Fig. 6 is a view of the end section of a branch pipe shown formed to match the contour of the spot face of Fig. 4.

Figs. 6 and 7 show two views of a branch pipe 18 of which there may be one or several joined to the header. The diameter of pipe 18 is such that it is necessary to form the end section 17 thereof to a contour conforming to the contour of the spot face. The ends of the pipe may be shaped by any desired method. One method has been to insert a special die into the pipe at the end and to apply a predetermined pressure to the die, thus shaping the end section as shown in Fig. 7 to have two parallel sides 20 and two circular sides 21. The wall sections adjoining the circular sides flare outwardly.

It is necessary to deform the end section of the branch pipe when the two adjoined pipes are cylindrical and of substantially the same diameter or the diameter of the spot face is larger than the diameter of the branch pipe.

The branch pipe may, however, have a uniform cross-section matching the contour of the base of the spot face and then need not be deformed at the ends. In particular, when the branch pipe is of smaller diameter than the header, the contour of the spot face may be circular and have the same diameter as the branch pipe, which need not be deformed. Fig. 8 shows such an embodiment.

When the branch pipe has an elongated end section to match an elongated spot face of the associated header, it is preferred to insert the end section in the recess of the header in such a position that the contour of the pipe end section is angularly displaced from the contour of the spot face. The wall of the branch pipe then is out of contact with the sectional surfaces of the header defining the recess. Then while maintaining contact between the end section of the branch pipe and the spot face of the header, the branch pipe is turned until wedged between the sectional surfaces of the header.

Figure 2:
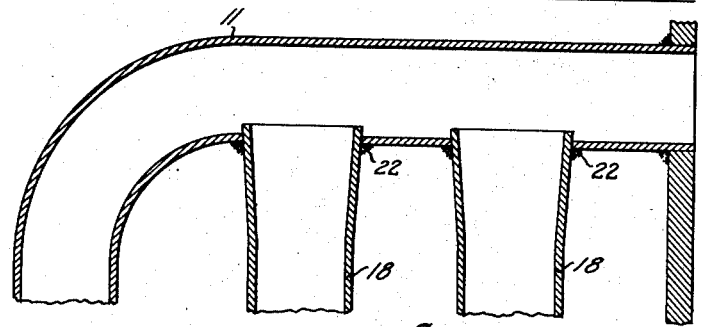
Fig. 2 is an enlarged cross-sectional view of a conduit taken on line II—II in Fig. 1.

After the two pipes are assembled, the end of the branch pipe against the spot face of the header as shown in Fig. 2, the pipes are united in fluid tight relation by a bead of weld metal 22 deposited along the line of intersection of the surfaces of the two pipes.

It is evident from the foregoing that a new pipe joint construction is provided which is simple and may be assembled at a very low cost. A material reduction in the waste of material has been accomplished. Cutting operations are no longer required on branch pipes to be joined to a header to form the conduit construction. Only one cutting operation is necessary on the header and that is much simpler and requires less handling of either the material or the cutting tool. The branch pipe members require at the most only one quick and simple forming operation. The welding is simplified in that the several members are self-held by being wedged. In addition the length of the bead of weld is reduced.

The uses for the described structure are manifold and obvious to those skilled in the art. The application in Fig. 1 to a transformer is not intended to be limiting.

Although the invention has been described in relation to certain specific embodiments, changes or modifications thereof are possible without departing from the scope of the invention. It is intended that the above description and the accompanying drawing should be considered as only illustrative. The invention is defined by the scope of the appended claim.

It is claimed and desired to secure by Letters Patent:

A conduit comprising a cylindrical pipe and a tube, one end of said pipe having a continuous flat annular surface disposed 90° to the axis of said pipe, said surface having a contour consisting of two opposite straight parallel edges of same length extending side by side and two opposite curved edges having a radius substantially extending from the longitudinal axis of said pipe, the end portion of said pipe comprising flat wall portions extending away from said end parallel edges and diverging toward and merging with the cylindrical part of said pipe, and curved wall portions having substantially the same curvature as said end curved edges extending away from said end curved edges and converging toward and merging with the cylindrical part of said pipe, said tube having a recessed opening disposed therein with the walls of said recessed opening forming a pair of coplanar surfaces parallel to the axis of said tube and two opposite curved walls of said recessed opening having a radius substantially extending from the longitudinal axis of said pipe which is normal to the longitudinal axis of said tube, said coplanar surfaces each having a contour consisting of two opposite straight edges extending side by side parallel to the axis of said tube and two opposite curved edges substantially transverse to said tube axis which also constitute the bottom edges of said curved walls, the length of said opposite straight edges being greater than the distance between said opposite straight edges, said tube and said pipe abutted together with said opposite straight parallel edges of said continuous flat surface of said pipe in substantially flat contact with said parallel coplanar surfaces of said recessed opening, said contours in substantial coincidence and said curved walls of said recess in contact with the outer curved sides of said pipe adjacent the end of said pipe, and a bead of weld metal applied externally along the intersection of the outer surfaces of said pipe and said tube to fasten said pipe to said tube.

HARRY P. SCHANE.
BENJAMIN E. FIDDLER.

References Cited in the file of this patent
UNITED STATES PATENTS

| Number | Name | Date |
|---|---|---|
| 603,244 | Avery | May 3, 1898 |
| 1,024,830 | Cook | Apr. 30, 1912 |
| 1,220,770 | Murray | Mar. 27, 1917 |
| 1,226,128 | Sonneborn | May 15, 1917 |
| 1,526,771 | Burnham | Feb. 17, 1925 |
| 1,950,947 | Mulroyan | Mar. 13, 1934 |
| 2,113,060 | Sandberg | Apr. 5, 1938 |
| 2,126,519 | Vogel | Aug. 9, 1938 |
| 2,174,218 | Green | Sept. 26, 1939 |
| 2,183,043 | Kerr | Dec. 12, 1939 |
| 2,368,391 | Young | Jan. 30, 1945 |
| 2,448,329 | Schwinn | Aug. 31, 1948 |
| 2,464,743 | Evans | Mar. 15, 1949 |
| 2,596,320 | Witte | May 13, 1952 |

FOREIGN PATENTS

| Number | Country | Date |
|---|---|---|
| 425,336 | Great Britain | Mar. 12, 1935 |